US006801570B2

United States Patent
Yong (10) Patent No.: US 6,801,570 B2
(45) Date of Patent: Oct. 5, 2004

(54) INTELLIGENT RATE OPTION DETERMINATION METHOD APPLIED TO ADSL TRANSCEIVER

(75) Inventor: Mei Yong, Acton, MA (US)

(73) Assignee: Aware, Inc., Bedford, MA (US)

(*) Notice: Subject to any disclaimer, the term of this patent is extended or adjusted under 35 U.S.C. 154(b) by 739 days.

(21) Appl. No.: 09/738,785

(22) Filed: Dec. 15, 2000

(65) Prior Publication Data

US 2001/0030998 A1 Oct. 18, 2001

Related U.S. Application Data

(60) Provisional application No. 60/172,343, filed on Dec. 16, 1999.

(51) Int. Cl.$^7$ ................................................. H04B 1/38
(52) U.S. Cl. ........................................ 375/219; 375/222
(58) Field of Search ............................... 375/219, 222, 375/260, 211, 225, 235; 455/422.1; 370/421, 385.21, 540, 320, 235, 412, 468

(56) References Cited

U.S. PATENT DOCUMENTS

| 5,479,447 A |   | 12/1995 | Chow et al. |  |
|---|---|---|---|---|
| 6,307,839 B1 | * | 10/2001 | Gerszberg et al. | .......... 370/235 |
| 6,498,808 B1 | * | 12/2002 | Tzannes | ...................... 375/225 |

FOREIGN PATENT DOCUMENTS

EP    0 869 647 A2    10/1998

WO    WO 98/10554 A    3/1998

OTHER PUBLICATIONS

"Vector excitation coding with dynamic bit allocation"; Yong Mei et al. Global Telecommunications Conference, 1988, and Exhibition, 'Communications for the Information Age.' Conference Record, GLOBECOM, '88., IEEE, Nov. 28–Dec. 1, 1988 pp.:290–294 vol. 1.*

International Search Report for PCT/US00/34192 dated Apr. 12, 2001.

* cited by examiner

*Primary Examiner*—Stephen Chin
*Assistant Examiner*—Ted Wang
(74) *Attorney, Agent, or Firm*—Miles & Stockbridge P.C.; Jason H. Vick (57) ABSTRACT

A system and method that generates rate options for ADSL transceivers is described. The system and method dedicates discrete multitone symbol bandwidth to bearer channels based on a prioritization of the bearer channels. A rate option generator determines the number of bytes contained in discrete multitone symbols modulated by a modulator. The rate option generator also receives a prioritization of the bearer channels and allocates portions of the number of bytes contained in the discrete multitone symbol to the bearer channels based on the prioritization. In order of priority, each bearer channel is allocated its maximum allowed number of bytes so long as discrete multitone symbol bandwidth remains available. Also, as part of the discrete multitone symbol bandwidth allocation, a bearer channel is not allocated less than its allowed minimum number of bytes.

24 Claims, 8 Drawing Sheets

| Input Parameter | Definition | Value, Meaning |
|---|---|---|
| LinkType | number representing designated communication direction | downstream communication represented by 1 upstream communications represented 0 |
| FrameMode | framing mode that determines the size and type of framing bytes | allowed values 0, 1, 2, 3 |
| DualLatency | specifies the number of latency paths | 1 for dual latency 0 otherwise |
| TcmFlag | specifies if trellis coded modulation is used | 1 for use of trellis coded modulation 0 otherwise |
| MaxBitsSymbol | maximum number of bits which can be carried per DMT symbol 110 for the designated communication direction | |
| Ncloaded | number of subchannels to which bits are allocated for each DMT symbol 110 | |
| CodingGain | coding gain used to calculate the corresponding MaxBitsPerSymbol | |
| Max_D | maximum interleave depth allowed for the designated communication direction | |
| Max_R | maximum number of check bytes 220, 412 per codeword 201, 426 per codeword 201, 426 allowed for the designated communication direction for either the fast or the interleaved data path | |
| Max_S | maximum number of FEC frames 203 per interleaved codeword 426 allowed for the designated communication direction | |
| Max_Delay | maximum end-to-end delay between the CO and CPE tranceivers allowed in the units of msec | |
| RS_Overhead | percentage of bytes per DMT symbol 110 allowed for error correction overhead bytes | |
| NumChannels | number of designated bearer channels AS0,AS1,AS2,AS3,LS0 to be allocated | |
| PriorityList[] | array lists the priorities of the designated bearer channels AS0,AS1,AS2,AS3, LS0 in order of descending priority | |
| PathType[] | array lists the data path type used by each designated bearer channel AS0,AS1,AS2,AS3,LS0 in order of descending priority | |
| MinRate[] | array lists the minimum data rate (in bytes) used by each designated bearer channel AS0,AS1,AS2,AS3,LS0 in order of descending priority | |
| MaxRate[] | array lists the maximum data rate (in bytes) used by designated each bearer channel AS0,AS1,AS2,AS3,LS0 in order of descending priority | |
| CodingGainTbl[] | array list the N coding gains used for generating the N rate options | |

INTELLIGENT RATE OPTION DETERMINATION METHOD APPLIED TO ADSL TRANSCEIVER

RELATED APPLICATIONS

This application claims the benefit of and priority to U.S. provisional application Ser. No. 60/172,343 filed Dec. 16, 1999, entitled "Intelligent Rate Option Determination Method Applied to ADSL Modem," incorporated by reference herein in its entirety.

FIELD OF THE INVENTION

This invention relates to communication systems using multicarrier modulation. More particularly, the invention relates to multicarrier communication systems that prioritize communication data streams.

BACKGROUND

The public switched telephone network (PSTN) provides a widely available form of electronic communication. In part because of its ready availability and low facilities cost, the PSTN is carrying increasing amounts of high rate data transmissions. Data here is understood to represent all forms of digitally encoded communication information including internet, Asynchronous Transfer Mode, voice, and video data and the like. Structured originally to provide voice communication with its narrow bandwidth requirements, the PSTN increasingly relies on digital systems to meet the demand for high transmission rates.

A major limiting factor in the ability to implement high-rate digital transmission has been the subscriber loop between the telephone central office (CO) and the customer premises equipment (CPE). This loop commonly comprises a single pair of twisted copper wires, which are well suited for carrying low-frequency voice signals for which a bandwidth of 0–4 kHz is adequate. However, this loop does not readily accommodate broadband communication requirements (i.e., bandwidths on the order of hundreds of kilohertz or more) without adopting new techniques for communication.

One approach to this problem has been the development of discrete multitone digital subscriber line (DMT DSL) technology. This and other forms of DMT-based DSL technology (such as ADSL, HDSL, etc.) are referred to as "DSL technology" or simply "DSL". The operation of discrete multitone systems and their application to DSL technology is discussed more fully in "Multicarrier Modulation For Data Transmission: An idea whose Time Has Come." IEEE Communications Magazine, May 1990, pp. 5–14.

The device that transmits and receives data, built according to DSL technology, is often referred to as a DSL transceiver. The DSL transceivers used at the central office and at the customer premises site are referred to as the CO DSL transceiver and the CPE DSL transceiver, respectively.

In DSL technology, communication over the local subscriber loop between the CO transceiver and the CPE transceiver, is accomplished by modulating the data to be transmitted onto a multiplicity of discrete frequency carriers which are summed together and then transmitted over the subscriber loop. Individually, the carriers form discrete, non-overlapping communication subchannels of limited bandwidth. Collectively, the carriers form a broadband communication channel. At the receiver end, the carriers are demodulated and the data is recovered.

Each subchannel carries a number of bits which may vary from subchannel to subchannel, depending on, for example, the signal-to-noise ratio (SNR) of the individual subchannel. The aggregate communication rate may also vary for different subscriber loops and different communication conditions. The number of bits that can be accommodated under a specified set of communication conditions is known as the "bit allocation" of the subchannel.

The SNR of the respective subchannels is determined by transmitting a reference signal over the various subchannels and measuring the SNR of the received signal. The loading parameters (including the number of bits allocated to each subchannel and the subchannel gains) are typically calculated at the receiving ("local") end of the subscriber line (e.g., at the CPE transceiver in the case of transmissions from the telephone central office to the subscriber, and at the CO transceiver in the case of transmissions from the subscriber premises to the central office). These parameters are communicated to the transmitting ("remote") end so that each transmitter-receiver pair uses the same communication parameters. The bit allocation and subchannel gain parameters are stored at both ends of the communication pair link for use in defining the number of bits to be used on the respective subchannels in transmitting data to a particular receiver. Other subchannel parameters such as time and frequency domain equalizer coefficients may also be stored to aid in defining the subchannel communication.

The Telecommunication Standardization Sector of the International Telecommunication Union (ITU-T) approved two DSL communication system standards, "Asymmetrical Digital Subscriber Line (ADSL) Transceiver", documented in Draft Recommendation G.992.1, Melbourne, Australia, Mar. 29, 1999, and "Splitterless Asymmetrical Digital Subscriber Line (ADSL) Transceiver", documented in Draft Recommendation G.992.2, Feb. 17, 1999. Both of these standards specify that the transceiver utilizes DMT-based modulation to transmit data over traditional telephone lines, referred to as "plain old telephone service" or POTS. In these Recommendations, the data rate of communication from the CO transceiver to CPE transceiver, called downstream communication, is different from the data rate from the CPE transceiver to the CO transceiver, called upstream communication. The transceiver built according to the G.992.1 Recommendation is traditionally referred to as the full-rate ADSL transceiver, or G.dmt transceiver; the transceiver built according to the G.992.2 recommendation is traditionally referred to as the G.lite transceiver. A significant portion of the G.lite transceiver is a subset of the G.dmt transceiver.

Both G.dmt and G.lite transceivers use communication principles common to other DMT-based DSL transceivers, namely data is communicated using non-overlapping subchannels, each of which can carry a different number of bits based on its SNR measurement.

During the transceiver initialization phase, a channel analysis is performed to determine the bit allocation of each subchannel. The channel analysis determines the maximum number of bits that each subchannel can carry based on the channel SNR measurement, the required minimum SNR margin (which is determined by the maximum tolerated bit error rate), and the coding gain. The coding gain, obtained by using Reed-Solomon Coding or Trellis Coding methods and measured in decibels, can increase the total number of bits available per unit of modulated information given the maximum tolerated bit error rate. After channel analysis, the maximum aggregate communication rates for the specified communication conditions are obtained for both downstream and upstream communications. Gathered by the CO transceiver and communicated to the CPE transceiver in a specified message, this data is used to define the rate options available to both the CO transceiver and CPE transceiver. As specified in the G.992.1 and G.992.2 Recommendations, the CO transceiver provides four downstream and four upstream rate options which can be employed by the CPE and CO transceivers respectively.

To support various applications, as specified in the G.992.1 Recommendation, the G.dmt transceiver supports up to seven downstream bearer channels, and up to three upstream bearer channels, where a bearer channel is defined as a user communication stream of data communicated at a specified communication rate that is communicated without modification by an ADSL transceiver.

A G.dmt transceiver can also transmit data in two different latency paths. The first path is called the fast data path which is used for delay sensitive applications, such as voice telephony. The second path is called the interleaved data path which is used for error sensitive applications, such as file transfer applications and video applications which are more affected by transmission errors than by transmission delays. To accommodate the framing requirements of different applications, the G.992.1 Recommendation also specifies four framing modes each of which has a different amount of overhead framing bits.

Given the complexity of multiple framing modes, multiple bearer channels, and dual latency paths, there exists a need for a process to generate a set of rate options for either downstream or upstream communication. There is a further need that this process effectively allocate the total available bits carried by a DMT symbol to different bearer channels according to the given channel conditions and supported operation modes.

SUMMARY OF THE INVENTION

The present invention features a system and a method that dedicates communication bandwidth to at least one prioritized bearer channel. In one aspect the invention features a method used in multicarrier communications between transceivers. According to the invention, the number of bits contained in a discrete multitone symbol is determined, prioritization information regarding the at least one bearer channel is received, and portions of the discrete multitone symbol are allocated to the at least one bearer channel based on the prioritization.

In one embodiment, the at least one bearer channel has an associated maximum number of bits. When portions of the discrete multitone symbol are allocated to the at least one bearer channel, that bearer channel is allocated its maximum number of bits. The allocation procedure is done in the order of the priority of the at least one bearer channel and continues as long as bandwidth is available in the discrete multitone symbol.

In another embodiment, the at least one bearer channel has an associated minimum number of bits. When portions of the discrete multitone symbol are allocated to the at least one bearer channel, that bearer channel is allocated at least its minimum number of bits.

In yet another embodiment, the number of overhead error correction check bytes is determined.

In still another embodiment, an input parameter designating a maximum number of bits supported given a specified coding gain is received. In other embodiments, input parameters designating a framing mode, a maximum interleave depth, a maximum number of error correction check bytes, a latency path, a maximum allowed delay for communications between transceivers in the multicarrier communication system, and a number of subchannel carriers in the discrete multitone symbol carrying bits are received.

In another aspect, the invention features a method for dedicating bandwidth to a plurality of prioritized bearer channels. The number of bits contained in a discrete multitone symbol modulated by a modulator are determined. Prioritization information regarding the plurality of bearer channels is received. In addition the number of bytes allocated to each of the plurality of bearer channels using a fast data path and an interleaved data path is determined based on the prioritization. Further, the number of check bytes per discrete multitone symbol for the fast and the interleaved data paths is determined. Also determined are the number of frames per interleaved codeword and an interleave depth for the interleaved data path.

In another aspect, the invention features a multicarrier communication system having at least one bearer channel and a transceiver dedicating bandwidth to the at least one bearer channel. The transceiver includes a modulator that modulates discrete multitone symbols and a rate option generator. The rate option generator determines the number of bits contained in the discrete multitone symbol and receives prioritization information regarding the at least one bearer channel. In addition the rate option generator allocates a portion of the number of bits contained in the discrete multitone symbol to the at least one bearer channel based on the prioritization.

In one embodiment the at least one bearer channel has an associated maximum number of bits. When portions of the discrete multitone symbol are allocated to the at least one bearer channel, the rate option generator allocates to each bearer channel its maximum number of bits. The allocation procedure is done in the order of the priority of the at least one bearer channel and continues as long as bandwidth is available in the discrete multitone symbol.

In another embodiment, the at least one bearer channel has an associated minimum number of bits. When portions of the discrete multitone symbol are allocated to the at least one bearer channel, the rate option generator allocates to each bearer channel at least its minimum number of bits.

In yet another embodiment the rate option generator determines a number of overhead error correction check bytes.

In still another embodiment the rate option generator receives an input parameter designating a maximum number of bits supported given a specified coding gain. In other embodiments the rate option generator receives input parameters designating a framing mode, a maximum interleave depth, a maximum number of error correction check bytes, a latency path, a maximum allowed delay for communications between transceivers in the multicarrier communication system, and a number of subchannel carriers carrying bits in the discrete multitone symbol.

In another aspect the multicarrier communication system dedicates communication bandwidth to a plurality of prioritized bearer channels. In one aspect, a rate option generator determines the number of bits contained in a discrete multitone symbol. The discrete multitone symbol is modulated by a modulator. In addition the rate option generator receives prioritization information regarding the plurality of bearer channels. This prioritization information is used by the rate option generator to determine the number of bytes to allocate to each of the plurality of bearer channels using a fast data bath. The prioritization information is also used by the rate option generator to determine the number of bytes to allocate to each of the plurality of bearer channels using an interleaved data path. Further, the rate option generator determines the number of check bytes per discrete multitone symbol for the fast data path and the number of check bytes per discrete multitone symbol for the interleaved data path. Also, the rate option generator determines the number of frames per interleaved codeword and the interleave depth for the interleaved data path.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

FIG. 5A is a table listing input parameters of a process in accordance with the principles of the invention;

DESCRIPTION OF THE INVENTION

Figure 1:
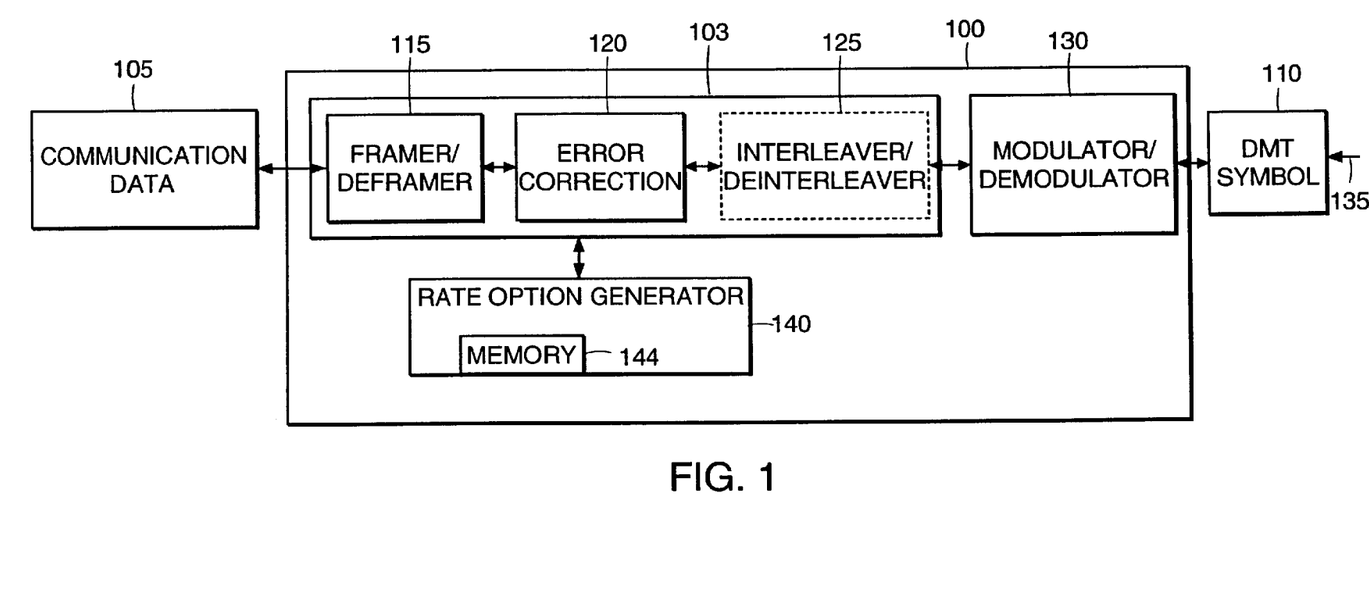
FIG. 1 is a block diagram of an embodiment of an exemplary transceiver embodying the principles of the invention.

Referring to FIG. 1, a multicarrier transceiver 100 (e.g., a modem) embodying the principles the invention is shown. The transceiver 100 includes a framing/coding/interleaving (FCI) block 103, a modulator/demodulator block 130, and a rate option generator 140. The rate operation generator is in communication with the FCI block 103. The transceiver 100 is in communication with a subscriber line 135. The FCI block 103 includes a framer/deframer block 115, an error correction block 120, and possibly an interleaver/deinterleaver block 125. The rate option generator 140 includes a memory 144.

When transmitting information, the transceiver 100 takes as input communication data 105 and produces as output DMT symbols 110. The communication data 105 is framed by the framer/deframer block 115, encoded by the error correction block 120, possibly interleaved by the interleaver/deinterleaver 125 block, and modulated by the modulator/demodulator block 130. When receiving information, the transceiver 100 takes as input DMT symbols 110 and produces as output communication data 105. The DMT symbols 110 are demodulated by the modulator/demodulator 130, possibly deinterleaved by the interleaver/deinterleaver block 125, decoded by the error correction block 120 and deframed by the framer/deframer block 115. The transceiver 100 transmits and receives the DMT symbols 110 over the subscriber line 135.

Figure 2:
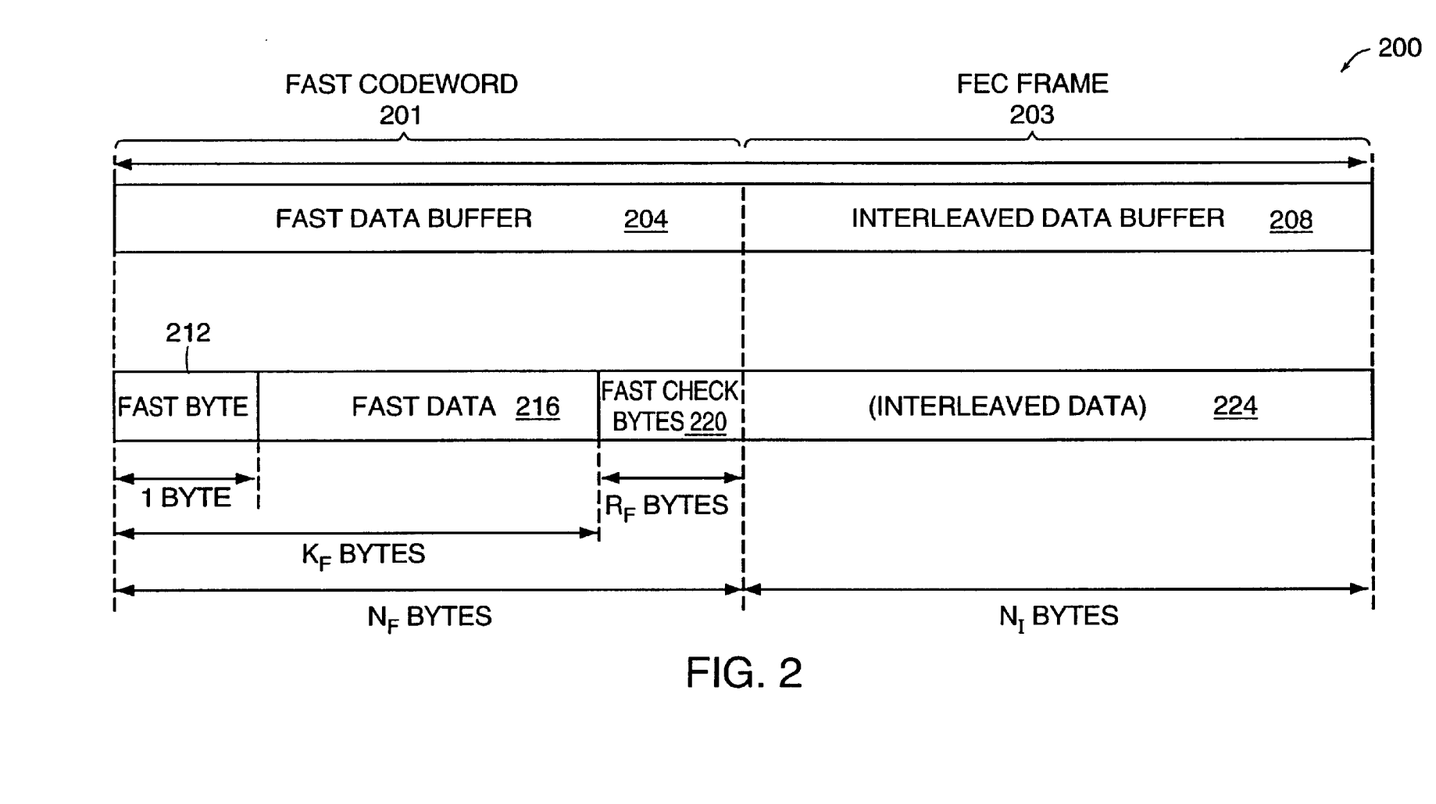
FIG. 2 is a diagram of the structure of a data frame.

As specified in the G.991.1 Recommendation, the input communication data 105 that is communicated over the subscriber line 135 using the G.dmt transceiver is partitioned into data frames by the framer/deframer block 115. Each data frame consists of a fixed number of bytes. The structure of a data frame 200 is shown in FIG. 2. The data frame 200 includes a fast data buffer 204 and an interleaved data buffer 208 that correspond respectively to a fast codeword 201 and a FEC frame 203. The fast data buffer 204 includes a fast byte 212, fast data 216, and fast check bytes 220. These bytes 212, 216, 220 are framing overhead, payload and error correction check bytes respectively. One example of an error correction technique used in ADSL transceivers is Reed-Solomon coding. The size of the fast byte 212 is one byte. The size of the fast data 216 is designated by the expression $K_F-1$, where $K_F$ is a variable representing the size of the fast data 216 and the fast byte 212 combined. The size of the fast check bytes 220 is represented by the variable $R_F$. The size of the fast data buffer 204 is represented by the variable $N_F$. The interleaved data buffer 208 includes interleaved data 224 which is $N_I$ bytes long. DMT symbols 110 are modulated units of information where the unit of information contained in a single DMT symbol 110 corresponds to the unit of information contained in a data frame 200. A DMT symbol 110 is the sum of the information contained in the bits modulated onto the subchannels. The number of bytes modulated by DMT symbols 110 used for upstream and downstream communication need not be the same.

Figure 3:
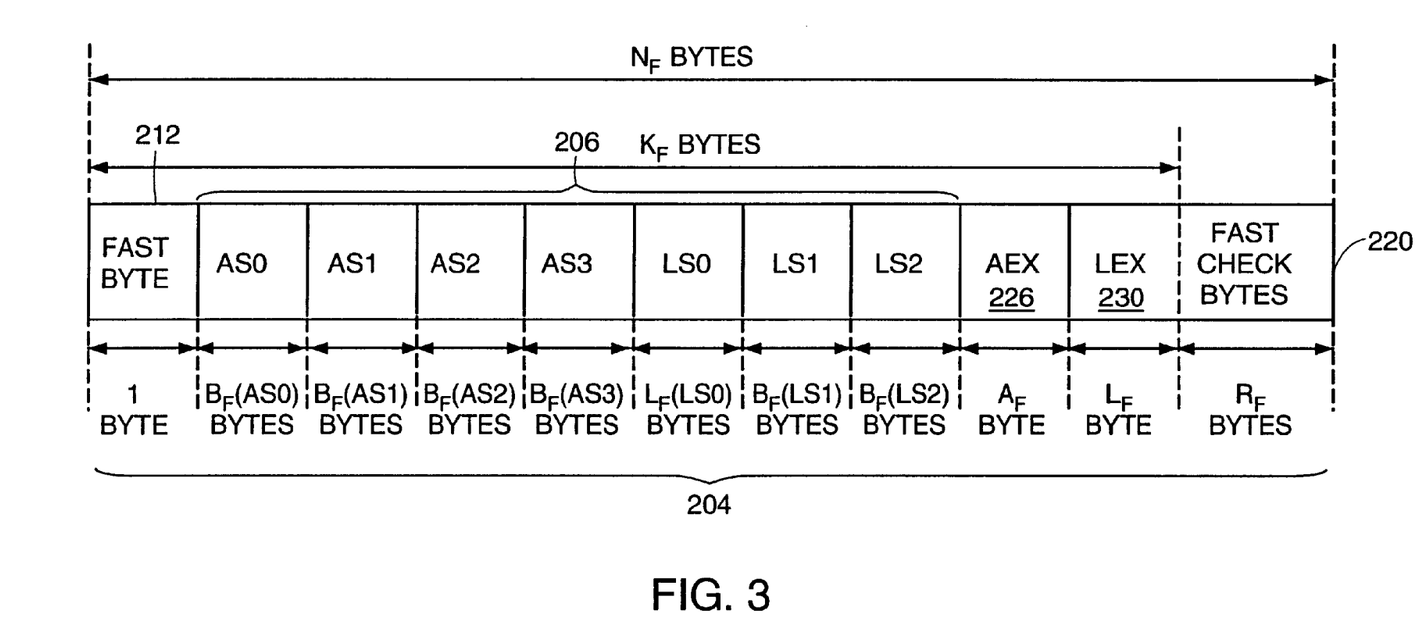
FIG. 3 is a diagram of the structure of a fast data buffer.

The structure of the fast data buffer 204 is shown in more detail in FIG. 3. The first byte is the required overhead fast byte 212. This byte is followed by up to seven optional payload bytes 206, designated by AS0, AS1, AS2, AS3, LS0, LS1 and LS2, for one or more bearer channels. The bearer channels will generally be referred to by the reference number 206 which will be considered to refer to some or all or AS0, AS1, AS2, AS3, LS0, LS1 and LS2. These payload bytes 206 are respectively sized as $B_F(AS0)$, $B_F(AS1)$, $B_F(AS2)$, $B_F(AS3)$, $B_F(LS0)$, $B_F(LS1)$, and $B_F(LS2)$ bytes. A single byte AEX byte ($A_F$) 226 is present if at least one of the bearer channels AS0 to LS2 is present. A single byte LEX byte ($L_F$) 230 is present if at least one of the bearer channels LS0 to LS2 is present. In one embodiment, the number of fast check bytes 220 are experimentally chosen as a percentage, for example 10%, of the total number of fast data buffer 204 bytes $N_F$, to balance the FEC overhead requirements with the FEC error correction capabilities.

Figure 4:
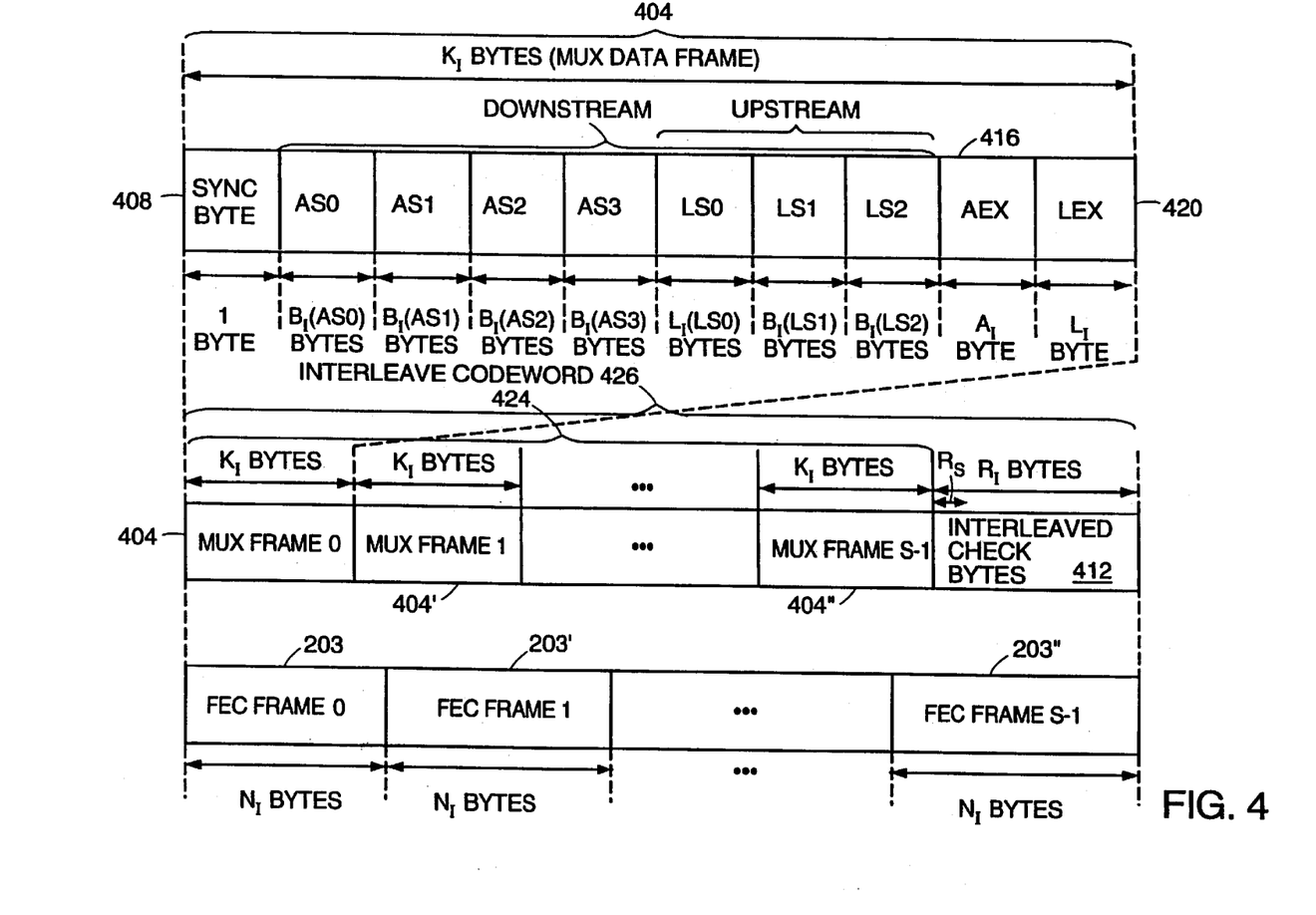
FIG. 4 is a diagram of the structure of an interleaved data buffer.

As shown in FIG. 4, the interleaved data buffer 208 of FIG. 2 is structured differently from the fast data buffer 204. In constructing the interleaved data buffer 208, the multiplex (Mux) data frames 404, 404', 404'' (generally 404) are first formed. Each Mux data frame 404 contains one overhead byte, called the synch byte 408, and optional payload data bytes $B_I(AS0)$, $B_I(AS1)$, $B_I(AS2)$, $B_I(AS3)$, $B_I(LS0)$, $B_I(LS1)$, and $B_I(LS2)$ for, respectively, one or more bearer channels 206. Each Mux data frame 404 contains $K_I$ bytes. As in the fast data buffer 204, a single byte AEX byte ($A_I$) 416 is present if at least one of the bearer channels AS0 to LS2 is present. A single byte ($L_I$) 420 is present if at least one of the bearer channels LS0 to LS2 is present.

Next, interleaved check bytes 412 are calculated for a set 424 of S Mux data frames 404 and appended to the end of the set 424. The variable S represents the number of Mux data frames 404 in the set 424. The set 424 of Mux data frames 404 and the corresponding interleaved check bytes 412 are included in the interleaved codeword 426. The interleaved check bytes 412 are $R_I$ bytes in size. The number of check bytes per Mux frame is $R_I$ divided by S bytes in size, as represented by $R_S$ (i.e., $R_S = R_I/S$). Finally, the interleaved codeword 426 is evenly divided into S FEC Frames, FEC frame 0 203, FEC frame 1 203', ..., FEC frame S-1 203'' (generally FEC frame 203). The FEC frame 203 data segments are each $N_f$ bytes in size. Each of the FEC frames 203 corresponds to the interleaved data 224 placed in the interleaved data buffer 208.

All of the data fields shown in FIGS. 1, 2, 3 and 4 are integral numbers of bytes. Since DMT symbols 110 are transmitted at the rate of 4,000 symbols/second, a bearer channel 206 allocated the size of one byte is capable of transmitting or receiving data at a rate of 32 kbits/second.

In the G.992.1 Recommendation, four different framing modes, 0 to 3 are specified. Framing mode 0 and 1 use full overhead framing in which the fast byte 212 and synch byte 408 are always present and the AEX bytes 226, 416 and the LEX bytes 230, 420 may be present depending on the bearer channels 206 that are used. Framing mode 2 uses reduced overhead framing in which the fast byte 212 and synch byte 408 are always present and the AEX bytes 226, 416 and the LEX bytes 230, 420 are not present. Framing mode 3 uses further reduced overhead framing in which the fast byte 212 and synch byte 408 are merged into a single byte and the AEX bytes 226, 416 and the LEX bytes 230, 420 are not present. In the G.992.2 Recommendation, only framing mode 3 is specified. The other three framing modes are not allowed.

The G.992.1 and G.992.2 Recommendations require that the CO transceiver provide four downstream rate options and four upstream rate options. Each rate option specifies four parameters: (1) the number of bytes per symbol allocated to each bearer channel $B_F(AS0)$, $B_F(AS1)$, $B_F(AS2)$, $B_F(AS3)$, $B_F(LS0)$, $B_F(LS1)$, and $B_F(LS2)$ using the fast data path and the number of bytes per symbol allocated to each bearer channel $B_I(AS0)$, $B_I(AS1)$, $B_I(AS2)$, $B_I(AS3)$, $B_I(LS0)$, $B_I(LS1)$, and $B_I(LS2)$ using the interleaved data path, (2) the number $R_F$ of fast check bytes 220 per symbol for the fast data path and the number $R_S$ of interleaved check bytes 412 per symbol for the interleaved data path, (3) the number S of FEC frames 203 per interleaved codeword 426, and (4) the interleave depth D for interleaved data. The parameters S and D are only defined for the interleaved data path since in the fast data path, S and D are always equal to 1 byte. According to the current embodiment, the CO transceiver formulates the rate options based on a channel analysis at both ends and initial information exchanged between the CO and CPE transceivers to decide the set of common operation modes. The initial information includes the framing mode to use, the latency path, and the like.

By using prioritized the bearer channels 206, transceivers embodying the principles of the invention can perform an efficient and flexible process for generating the upstream and downstream rate options. In brief overview, a process in accordance with the principles of the invention includes determining the size of the DMT symbol 110. In addition the process includes, for both upstream and downstream communications, receiving bearer channel 206 prioritization information. The process also includes allocating the available bandwidth of the DMT symbol 110 according to the prioritization. Not only does the process not require significant computational overhead but also it can readily handle bearer channels 206 having different data rates and different priorities. Further, the process allows users of the system (e.g., the telephone central office or the application layer) to control bandwidth allocation by supplying the bearer channel 206 prioritization and date rate information to the transceiver 100.

Figure 5:
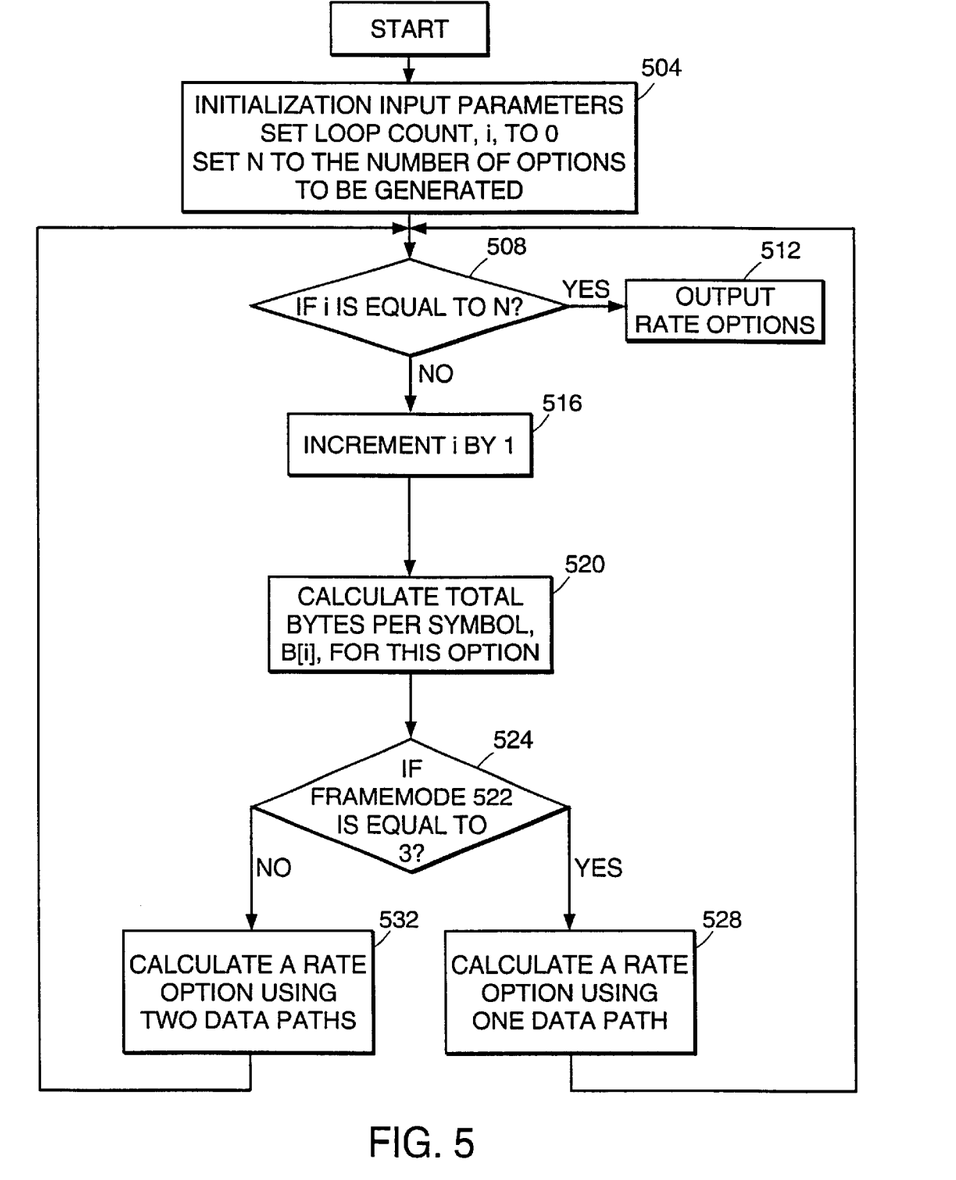
FIG. 5 is flow chart of an embodiment of a process for determining rate options in accordance with the principles of the invention.

FIG. 5 shows an overview of an embodiment of a process for generating one or more rate options in accordance with the principles of the invention. The process begins by initializing a set of input parameters, described below in more detail, setting a loop count variable i to zero, and setting the number of rate options N to be generated (step 504). As mentioned above, N is equal to four rate options for each communication direction in the G.992.1 and G.992.2 Recommendations. After initialization, the process enters an iterative phase in which each of the N rate options is generated. The loop count, i, is compared with parameter N (step 508). If is equal to N, then the process ends and formulated rate options are stored in memory by the CO transceiver and a copy is sent to the CPE transceiver (step 512). Otherwise, i is incremented by 1 (step 516). Next, the process determines the total number of bytes per symbol available for this rate option (step 520). Then, the input parameter FrameMode 522, as set in initialization, is compared with the number three (step 524). As mentioned above, the third framing mode uses further reduced overhead. If FrameMode 522 is equal to three, then the corresponding rate option is formed using one data path, either the fast or interleaved data path (step 528), otherwise the corresponding rate option is formed using two data paths, both the fast and interleaved data path (step 532).

In the subsequent discussion, the following example will be used for clarification. Consider two applications that are designated five downstream bearer channels AS0, AS1, AS2, AS3, LS0 that are prioritized as AS3, LS0, AS2, AS0, AS1. As mentioned above, the prioritization information is supplied by users of the system. In addition consider that the bear channels AS3 and LS0 have constant data rates of 128 kbits/second (4 bytes per symbol) and use the fast data path. Further, consider that the bearer channels AS0, AS1, and AS2 can be allocated data rates between 32 kbits/second (1 byte per symbol) to 6144 kbits/second (192 bytes per symbol) and use the interleaved data path.

Before generating N rate options, the input parameters are initialized at step 504, where symbol x[ ] denotes an array of parameter values. The input parameter initialization is summarized in FIG. 5A. The bearer channel references in FIG. 5A are also with reference to the example mentioned above. As part of the initialization, two sets of input parameters are initialized. One set is for the upstream communication direction and one set is for the downstream communication direction. Initializing each set of input parameters includes:

setting the parameter LinkType to a number representing the designated communication direction, for example, downstream communications are represented by 0 and upstream communications are represented by 1;

setting the parameter FrameMode 522 to a framing mode, 0, 1, 2, or 3, the meaning of which are discussed above;

setting the parameter DualLatency to 1 if dual latency paths are used, 0 otherwise;

setting the parameter TcmFlag to 1 if trellis coded modulation is used, 0 otherwise;

setting the parameter MaxBitsPerSymbol to the maximum number of bits which can be carried per DMT symbol 110 for the designated communication direction (the CO transceiver determines the upstream parameter and CPE transceiver determines the downstream parameter through channel analysis and bit allocation processes);

setting the parameter Ncloaded to the number of subchannels to which bits are allocated for each DMT symbol 110;

setting the parameter CodingGain to the coding gain used to calculate the corresponding "MaxBitsPerSymbol";

setting the parameter Max_D to the maximum interleave depth allowed;

setting the parameter Max_R to the maximum number of check bytes 220, 412 per codeword 201, 426 allowed for either the fast or interleaved data path;

setting the parameter Max_S to the maximum number of FEC frames 203 per interleaved codeword 426 allowed;

setting the parameter Max Delay to the maximum end-to-end delay between the CO and CPE transceivers allowed in the units of msec;

setting the parameter RS_Overhead to the percentage of bytes per DMT symbol 110 allowed for error correction overhead, for example Reed-Solomon check bytes;

setting the parameter NumChannels to the number of designated bearer channels (in our example AS0, AS1, AS2, AS3, LS0);

setting the parameters in the array PriorityList[ ] to list the priorities (in our example AS3, LS0, AS2, AS0, AS1) of the designated bearer channels (in our example AS0, AS1, AS2, AS3, LS0) in order of descending priority, (for example, each of the bearer channels AS0 to LS2 is assigned a value from 0 to 6 respectively and then each entry in the PriorityList[ ] array is assigned one of these values for each of the designated bearer channels (e.g., AS0, AS1, AS2, AS3, LS0) where the first entry in the array represents the designated bearer channel with the highest priority (in our example AS3));

setting the parameters in the array PathType[ ] to list the data path type used by each designated bearer channel (e.g., AS0, AS1, AS2, AS3, LS0) in order of descending priority, (for example, each entry of PathType[ ] is set to 0 for the fast data path or 1 for the interleaved data path);

setting the parameters in the array MinRate[ ] to list the minimum data rate (in bytes) used by each designated bearer channel (e.g., AS0, AS1, AS2, AS3, LS0) in order of descending priority (for example, the first entry in the array MinRate[ ] represents the minimum data rate for the highest priority designated bearer channel (e.g., AS3));

setting the parameters in the array MaxRate[ ] to the list the maximum data rate (in bytes) used by each designated bearer channel (e.g., AS0, AS1, AS2, AS3, LS0) in order of descending priority; and setting the parameters in the array CodingGainTbl[ ]: to list the N coding gains used for generating the N rate options for particular applications or systems.

For the example specified above, the NumChannels, PriorityList[ ], PathType[ ], MinRate[ ], and MaxRate[ ] parameters would be set as follows:

NumChannels 5;

PriorityList[1]=AS3, PriorityList[2]=LS0, PriorityList[3]=AS2

PriorityList[4]=AS0, PriorityList[5]=AS1

PathType[1]=FAST_DATA_PATH, PathType[2]=FAST_DATA_PATH,

PathType[3]=INTERLEAVED_DATA_PATH

PathType[4]=INTERLEAVED_DATA_PATH

PathType[5]=INTERLEAVED_DATA_PATH

MinRate[1]=4, MinRate[2]=4,

MinRate[3]=1, MinRate[4]=1, MinRate[5]=1

MaxRate[1]=4, MaxRate[2]=4

MaxRate[3]=192, MaxRate[4]=192, MaxRate[5]=192

In the present example during initialization, the bearer channels AS0, AS1, AS2, AS3, LS0, are set to 0 to 4 respectively, FAST_DATA_PATH is set to 0 and INTERLEAVED_DATA_PATH is set to 1 by the transceiver 100.

The parameters FrameMode, DualLatency, TcmFlag, Max_D, Max_R and Max_S are determined through initial handshake and message exchange procedures that evaluate a set of common operation parameters. The parameters MaxBitsPerSymbol, Ncloaded and CodingGain are determined as part of each transceiver's channel analysis and bit loading procedures. The CPE transceiver sends its set of parameters to the CO transceiver using a specified message, the R_MSG_RA message. The parameters Max Delay and RS_Overhead and the parameter array CodingGainTbl[ ] are determined by the CO transceiver either experimentally or based on application requirements. It is desirable to set one entry of the coding gain parameter array CodingGainTbl[ ] to 0 for the situation when no coding gain is applied and to set another entry to the input parameter CodingGain which is used by the corresponding transceiver to obtain the parameter MaxBitsPerSymbol. The parameter NumChannels and the parameter arrays PriorityList[ ], PathType[ ], MinRate[ ] and MaxRate[ ] are typically selected by higher layer applications or configured by the telephone central office.

At step 520 of FIG. 5, the total number of bytes for the $i^{th}$ rate option (where i is equal to 0, 1, . . . N−1) is calculated. Calculating the $i^{th}$ rate option includes computing (1) the number of overhead bits for Trellis Coding, (2) the number of bits per DMT symbol 110 for a given coding gain for the $i^{th}$ rate option, and (3) the number of bytes per DMT symbol 110 available for the $i^{th}$ rate option.

1) An exemplary formula for computing the number of overhead bits used for Trellis Coding, as denoted by TcmOh, is:

if TcmFlag is set to 1, TcmOh=((Ncloaded+1)/2)+4; and if TcmFlag is set to 0, TcmOh=0, as given in the G.992.1 Recommendation.

2) An exemplary formula for computing the number of bits per DMT symbol 110 for the given coding gain, denoted by B and where MaxBitsPerSymbol, CodingGainTbl[i], CodingGain, and Ncloaded are initialized at step 504, is $$B = MaxBitsPerSymbl + (CodingGainTbl[i] - CodingGain) * Ncloaded/3.$$

The exemplary formula assumes one bit per subchannel is gained for every dB of coding gain.

3) Given the B and TcmOh bit information, an exemplary formula for computing the total number of bytes per DMT symbol 110 available for the $i^{th}$ rate option, denoted by B[i], is $$B[i] = (B - TcmOh)/8.$$

Figure 6:
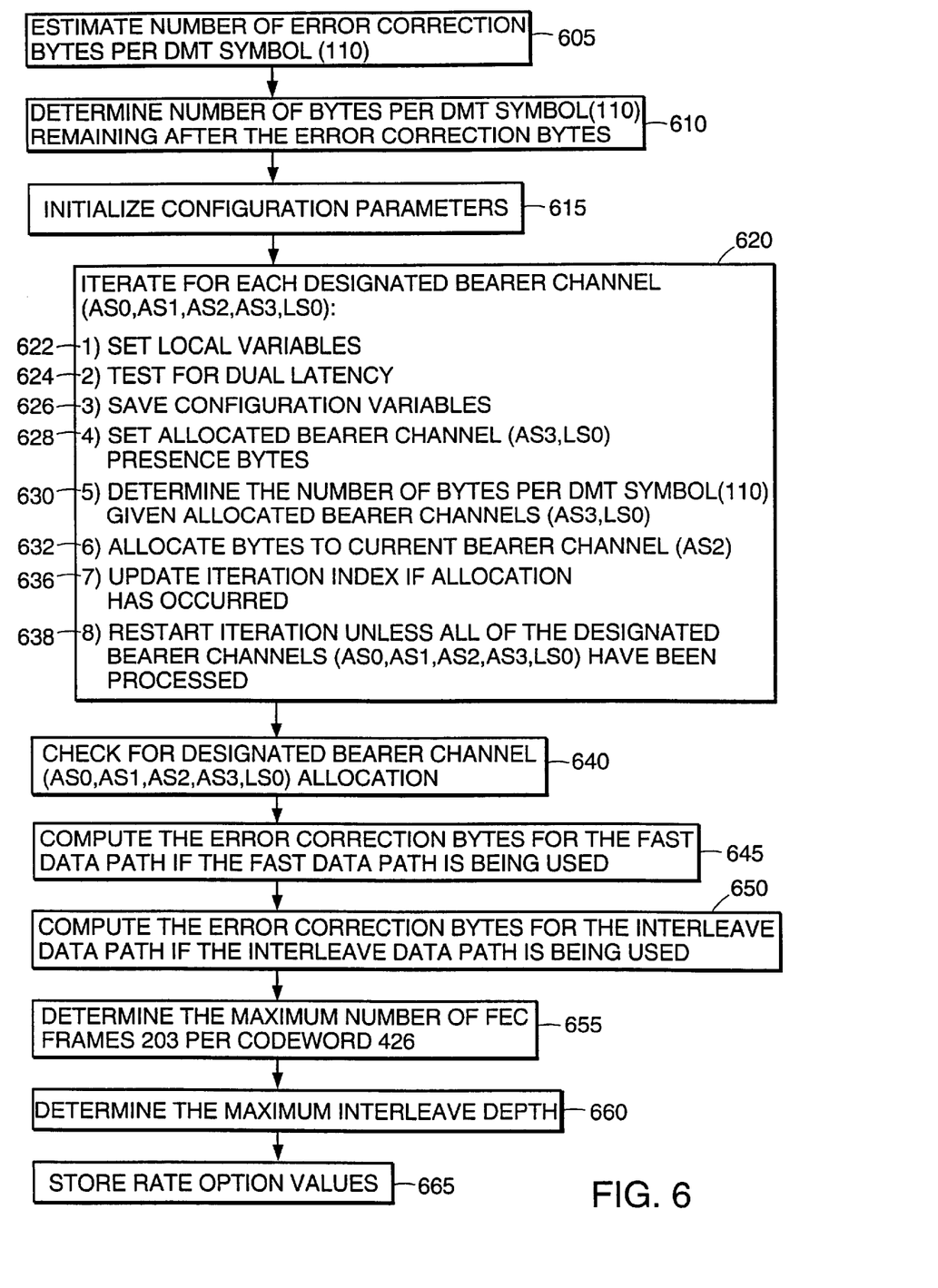
FIG. 6 is a flowchart of an embodiment of a process for calculating a rate option for two data paths.

If at step 524 the rate option generator 140 determines that the FrameMode 522 parameter is not equal to 3, then the rate option generator 140 calculates an $i^{th}$ rate option for the given total number of bytes per symbol B[i] for two data paths (step 532). FIG. 6 shows one embodiment of a process for calculating the $i^{th}$ rate option for two data paths. As with the preceding discussion, the bearer channel references in FIG. 6 are with respect to the example given above.

1) At step 605 the rate option generator 140 estimates the total number of bytes per DMT symbol 110 used for the check bytes 220, 412 (e.g., Reed Solomon Coding), denoted by $B_c$. An exemplary formula is $B_c=B[i]*RS\_Overhead.$ If $B_c$ is a fractional number, then it is rounded to the nearest integer with its upper bounds limited by the maximum number of bytes allowed for check bytes 220, 412. The maximum number of check bytes 220, 412 for a single path is 16 and for dual paths is 32.

2) At step 610 the rate option generator 140 computes the total number of bytes remaining after subtracting the bytes reserved for the check bytes 220, 412, denoted by $B_r$. An exemplary formula is $B_r=B[i]-Bc.$ 3) At step 615 the rate option generator 140 initializes the configuration parameters $K_{path}$, $A_{path}$, $R_{path}$, $B_{path}[i]$, D, and NumAllocChannels. NumAllocChannels represents the number of allocated bearer channels (e.g., AS0, AS1, AS2, AS3, LS0). The parameters $K_{path}$, $A_{path}$, $L_{path}$, $R_{path}$ and $B_{path}[j]$ indicate the lengths of the data fields shown in FIGS. 2, 3, and 4. The configuration parameters are initialized in the current embodiment in the following fashion:

$K_{path}$ and S are set equal to 1, and $A_{path}$, $R_{path}$, $B_{path}[j]$, D, and NumAllocChannels are set equal to 0. The subscript "path" corresponds to F for the fast data buffer and I for the interleaved data buffer, and j varies from 0 to the number of designated bearer channels (in our example, j varies from 0 to 4 corresponding to AS0 to LS0).

4) The next stage (620) in the process is an iterative rate allocation procedure that includes at least eight operations performed for each designated bearer channel (e.g., AS0, AS1, AS2, AS3, LS0). The index variable k goes from 1 to NumChannels, the number of designated bearer channels (e.g., AS0, AS1, AS2, AS3, LS0), where k equal to 1 corresponds to the channel with the highest priority, and k equal to NumChannels corresponds to the channel with the lowest priority. In the current example consider further that the AS2 bearer channel is the $k^{th}$, or current, designated bearer channel and the AS3 and LS0 bearer channels have already been allocated.

In one embodiment, the operations include: (1) setting local variables for the $k^{th}$ bear channel (e.g., AS2) (622), (2) testing for dual latency (624), (3) saving configuration variables (626), (4) setting bearer channel presence bytes (628), (5) determining the number of bytes per DMT symbol 110 available for the current bearer channel (e.g., AS2) (630), (6) allocating bytes to the current bearer channel (e.g., AS2) (632), (7) updating the iteration index if allocation has occurred (636), and (8) restarting the iteration unless all of the designated bearer channels (e.g., AS0, AS1, AS2, AS3, LS0) have been processed (638).

a) The operation 622 sets the local variables: bearer channel index, path type, minimum data rate, and maximum data rate. These variables are respectively denoted by ch, path, min_bytes and, max_bytes. Exemplary formulas are ch=PriorityList[k], path=PathType[k], min_bytes=MinRate[k], and max_bytes=MaxRate[k].

b) The operation 624 first determines if dual latency is supported. If dual latency is not supported and if the $k^{th}$ bearer channel (e.g., AS2) uses a different data path from that used by the $k^{th}$ previously allocated bearer channels (e.g., AS3, LS0), then no bytes are allocated to the $k^{th}$ bearer channel (e.g., AS2) and the rate option generator 140 skips to the operation 655 below.

c) The operation 626 saves the configuration variables $K_{path}$, $A_{path}$, $L_{path}$, to separate memory locations.

d) The operation 628 determines if FrameMode 522 is set to either 0 or 1. If it is not, than the rate option generator 140 skips to the operation 640 below. If FrameMode 522 was set to either 0 or 1 in the initialization step 504, then the rate option generator 140 determines whether any of the designated bearer channels (e.g., AS0, AS1, AS2, AS3, LS0) have been allocated. If any of the bearer channels AS0, AS1, AS2, AS3, LS0, LS1, LS2 have been allocated (as is the case in our example), then the AEX byte is created and $A_{path}$ and $L_{path}$ are set to 1. If any of the bearer channel LS0, LS2, LS3 have been allocated (as is the case in our example), then the LEX byte is created and the $L_{path}$ is set to 1. $A_{path}$ and $L_{path}$ are added to $K_{path}$ where $K_{path}$ represents a running tally of the number of bytes allocated to a particular path. If FrameMode 522 equals 2, $A_{path}$ and $L_{path}$ are set to 0 e) The operation 630 determines the number of remaining bytes in the DMT symbol 110 for the $k^{th}$ bearer channel (e.g., AS2), denoted by $B_k$, given the allocated designated bearer channels (e.g., AS3 and LS0). An exemplary formula is $B_k=B_r-K_F-K_I$, where $K_F$ and $K_I$ represent the bytes already allocated to the fast and the interleaved data paths.

f) The operation 632 first determines if $B_k$ is less than the minimum data rate given by min_bytes. If $B_k$ is less than the minimum data rate, then the rate option generator 140 restores the configuration variables saved in the third operation 626 and proceeds to the operation 636. If $B_k$ is greater than the maximum data rate given by max_bytes, then the rate option generator 140 allocates max_bytes bytes to the $k^{th}$ bearer channel (e.g., AS2) by setting $B_{path}[ch]$=max_bytes. If $B_k$ is less than max_bytes, but greater than or equal to min_bytes, then the rate option generator 140 allocates $B_k$ bytes to the $k^{th}$ bearer channel (e.g., AS2) by setting $B_{path}[ch]=B_k$. Finally, $K_{path}$ is updated by having $B_{path}[ch]$ added to it.

g) The operation 636 increments NumAllocChannels by 1 if any byte in the DMT symbol 110 has been allocated to the $k^{th}$ bearer channel (e.g., AS2).

h) The operation 638 compares k with the NumChannels parameter. If k equals NumChannels, then the rate option generator 140 proceeds to step 640. Otherwise, k is incremented by 1 and the next prioritized bearer channel (e.g., AS0) is processed starting with the operation 622 above.

5) At step 640 the rate option generator 140 checks the parameter NumAllocChannels. If NumAllocChannels is equal to 0, meaning no bearer channels could be allocated for the given total number of bytes per symbol B[i], then the process stops. If NumAllocChannels is greater than 0, then the rate option generator 140 proceeds to step 645.

6) At step 645 the rate option generator 140 determines if $K_F$ is greater than 0. If $K_F$ is greater than 0, then in one embodiment the rate option generator 140 computes the number $R_F$ of check bytes 220 per DMT symbol 110 used for the fast data buffer 204 by solving the exemplary equation $$(K_F+R_F)*RS\_Overhead=R_F.$$

This equation balances the size of $R_F$ with the size of $K_F$, the data to be communicated by the fast data buffer 204. $R_F$ is truncated to the nearest even number and its upper limit is set by Max_R.

7) At step 650 the rate option generator 140 determines if $K_I$ is greater than 0. If $K_I$ is greater than 0, then the rate option generator 140 computes the number $R_S$, as mentioned above $R_S$ is equal to $R_I$ divided by S, of interleaved check bytes 412 per DMT symbol 110 used for the interleaved data buffer 208 using the exemplary equation $$R_S=B[i]-K_F-K_I-R_F.$$

The upper limit for $R_S$ is set by Max_R.

8) At step 655 the rate option generator 140 chooses the maximum value of S, for the given $R_S$, such that the following exemplary expression is satisfied:

$$R_S*S<=Max\_R.$$

In addition, the rate option generator 140 ensures that the $R_I=R_S*S$ and S constraints, as specified in the ADSL standards, have been satisfied. In the G.992.1 Recommendation, the constraints are that $R_I$ must be an even number from 0 to 16 that is divisible by S. In the G.992.2 Recommendation, the constraints are that $R_I$ must be one of 0, 4, 8, or 16, and must be divisible by S.

9) At step 660 the rate option generator 140 chooses the maximum value of D, for the given S, such that S*D does not violate the end to end data transmission delay requirement of the G.992.1 or G.992.2 Recommendation. In the current embodiment, D is solved using the following exemplary equation:

$$S*D<=Max\_Delay*4-C,$$

where C is a constant that is related to the fixed delay associated with a particular implementation of the transceiver 100.

10) At step 665 the rate option generator 140 stores values for $B_{path}[j]$, $R_{path}$, S and D for the $i^{th}$ rate option in memory 144.

Figure 7:
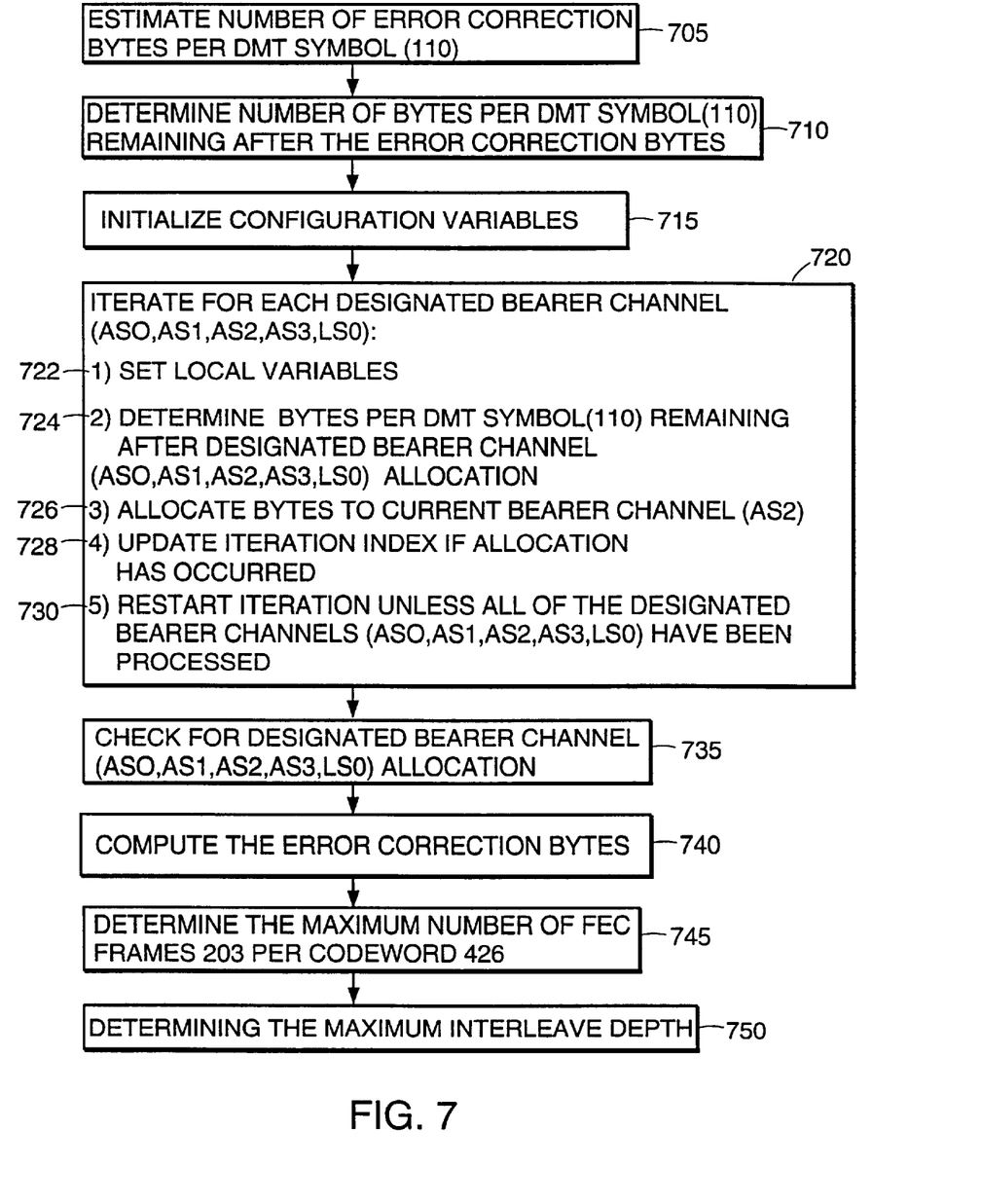
FIG. 7 is a flowchart of an embodiment of a process for calculating a rate option for a single data path.

If at step 524 the rate option generator 140 determines that the FrameMode 522 parameter is equal to 3, then the rate option generator 140 calculates an $i^{th}$ rate option for the given total number of bytes per symbol B[i] for one data path (step 528). FIG. 7 shows one embodiment of a process for calculating the $i^{th}$ rate option for one data path. As with the preceding discussion, the bearer channel references in FIG. 7 are with respect to the example given above.

1) At step 705 the rate option generator 140 estimates the total number of bytes per DMT symbol 110 used for the check bytes 220, 412 (e.g., Reed-Solomon Coding), denoted by $B_c$. An exemplary formula is $$B_c=B[i]*RS\_Overhead.$$

$B_c$ is limited to the maximum number of check bytes supported. If the fast data path is used, $B_c$ is rounded to the nearest even number.

2) At step 710 the rate option generator 140 computes the total number of bytes remaining after subtracting the bytes reserved for the check bytes 220, 412, denoted by $B_t$. An exemplary formula is $$B_t=B[i]-B_c.$$

3) At step 715 the rate option generator 140 initializes the configuration parameters $K_{path}$, B[j], R, S, D, and NumAllocChannels. The configuration parameters are initialized in the following exemplary fashion:

$K_{path}$ is set equal to 1, and

B[j], R, S, D and NumAllocChannels are set equal to 0 where j varies from 0 to the number of designated bearer channels (in our example j varies from 0 to 4 corresponding to AS0 to LS0). The configuration parameters $K_{path}$ and B[j] correspond to the lengths of the corresponding data fields shown in FIGS. 2, 3, and 4. Since framing mode 3 only supports use of one data path, $K_{path}$, R and B[j] can represent data field lengths for only either the fast data path or the interleaved path. For example, $K_{path}$ corresponds to $K_F$ if the data path is the fast data path as shown in FIG. 2 and FIG. 3, and to $K_I$ if the data path is the interleaved data path as shown in FIG. 2 and FIG. 4.

4) The next stage (720) in the process is an iterative rate allocation procedure that, for each designated bearer channel (e.g., AS0, AS1, AS2, AS3, LS0) includes at least five operations. The index variable k ranges from 1 to NumChannels. In one embodiment, the operations include: (1) setting local variables (722), (2) determining the number of bytes per DMT symbol 110 given the designated bearer channels (e.g., AS0, AS1, AS2, AS3, LS0) (724), (3) allocating bytes to the current bearer channel (e.g., AS2) (726), (4) updating the iteration index if allocation has occurred (728), (5) restarting the iteration unless all of the designated bearer channels (e.g., AS0, AS1, AS2, AS3, LS0) have been processed (730).

A) The operation 722 sets local variables for the bearer channel index, minimum data rate, and maximum data rate, respectively denoted by ch, min_bytes and, max_bytes. Exemplary expressions are ch=PriorityList[k], min_bytes=MinRate[k], and max_bytes=MaxRate[k].

B) The operation 724 determines the number of remaining bytes in the $k^{th}$ data frame 200, denoted by $B_k$, given the allocated designated bearer channels (e.g., AS3, LS0). An exemplary formula is $$B_k=B_t-K_{path}.$$

C) The operation 726 determines if $B_k$ is less than the minimum data rate of the current bearer channel (e.g., AS2) given by min_bytes. If $B_k$ is less than min_bytes, then the rate option generator 140 proceeds to the fourth subroutine (730). If $B_k$ is greater than the maximum data rate for this bearer channel (e.g., AS2), given by max_bytes, then the rate option generator 140 allocates max_bytes bytes to the $k^{th}$ bearer channel (e.g., AS2) by setting B[ch]= max_bytes. If $B_k$ is less than max_bytes, but greater or equal to min_bytes, then the rate option generator 140 allocates $B_k$ bytes to the $k^{th}$ bearer channel (e.g., AS2) by setting B[ch]=$B_k$. Finally, $K_{path}$ is updated by having B[ch] added to it.

D) The operation 728 increments NumAllocChannels by 1 if any byte in the data frame 200 has been allocated to the $k^{th}$ bearer channel (e.g., AS2).

E) The operation 730 compares k with the NumChannels parameter. If k equals NumChannels, then the rate option generator 140 proceeds to the step 735. Otherwise, k is incremented by 1 and the next prioritized bearer channel (e.g., AS0) is processed starting with the first function 722 above.

5) At step 735 the rate option generator 140 checks the parameter NumAllocChannels. If NumAllocChannels is equal to 0, meaning none of the designated bearer channels (e.g., AS0, AS1, AS2, AS3, LS0) could be allocated for the given total number of bytes per DMT symbol 110 B[i], then the process stops. If NumAllocChannels is greater than 0, then the rate option generator 140 proceeds to step 740.

6) At step 740 the rate option generator 140 computes the number of check bytes 220, 412 per DMT symbol 110 by subtracting the number of allocated bytes, represented by $K_{path}$, from the total number of available bytes per DMT symbol 110, $B_t$. The exemplary expression is $$R_{path}=B_t-K_{path}$$

where $R_{path}$ corresponds to $R_F$ when the fast data path is used and to $R_S$ (equal to $R_I$ divided by S) when the interleaved data path is used. If the fast data path is used, then $R_F$ is rounded to the nearest even number and its upper limit is given by Max_R. If the interleaved path is used, then the upper limit of $R_S$ is also given by Max_R. $R_S$ need not be rounded under the G.992.1 and G.992.2 Recommendations. Only the number of check bytes per codeword 201, 426 is required to be an even number, and as discussed above, $R_I$ and not $R_S$ is the number of check bytes per interleaved codeword 426.

7) At step 745 the rate option generator 140 chooses the maximum value of S, for the given $R_S$, such that the following exemplary expression is satisfied:

$$R_S*S<=Max\_R.$$

In addition, the rate options generator 140 ensures that the $R_S*S$ and S constraints, as specified in the ADSL standards, have been satisfied. As mentioned above in the G.992.1 Recommendation, $R_I$ must be an even number from 0 to 16 that is divisible by S. In the G.992.2 Recommendation, $R_I$ must be one of 0, 4, 8, or 16, and must be divisible by S.

8) At step 750 the rate option generator 140 chooses the maximum value of D, for the given S, such that S*D does not violate the delay requirement. In the current embodiment, D is solved using the following exemplary equation:

$$S*D<=Max\_Delay*4-C,$$

where C is a constant that is related to the fixed delay associated with an implementation of transceiver 100.

While the invention has been shown and described with reference to specific preferred embodiments, it should be understood by those skilled in the art that various changes in form and detail may be made therein without departing from the spirit and scope of the invention as defined by the following claims. For example, although the invention is described with respect to DMT modulation, the principles of the invention apply to DWMT (Discrete Wavelet Multitone) modulation. Further, although the specification uses ADSL to describe the invention, it is to be understood that any form of DSL can be used, i.e., VDSL, SDSL, HDSL, HDSL2, or SHDSL.

What is claimed is:

1. In a multicarrier communication system having at least one bearer channel, a method for dedicating bandwidth to the at least one bearer channel, the method comprising:

determining a number of bits contained in a discrete multitone symbol modulated by a modulator;

receiving a prioritization of the at least one bearer channel; and allocating a portion of the number of bits contained in the discrete multitone symbol to the at least one bearer channel based on the prioritization.

2. The method of claim 1 wherein:

the at least one bearer channel has an associated maximum number of bits and the allocating allocates to the at least one bearer channel in descending priority the maximum number of bits for the at least one bearer channel so long as a portion of the number of bits contained in the discrete multitone symbol remain unallocated.

3. The method of claim 2 wherein the at least one bearer channel has an associated minimum number of bits and the allocating allocates to the at least one bearer channel in descending priority at least the minimum number of bits for the at least one bearer channel.

4. The method of claim 1 further comprising determining the number of overhead error correction check bytes.

5. The method of claim 1 further comprising receiving an input parameter designating a maximum number of bits supported given a specified coding gain.

6. The method of claim 1 further comprising receiving an input parameter designating a framing mode.

7. The method of claim 1 further comprising receiving an input parameter designating a maximum interleave depth.

8. The method of claim 1 further comprising receiving an input parameter designating a maximum number of error correction check bytes.

9. The method of claim 1 further comprising receiving an input parameter designating a latency path.

10. The method of claim 1 further comprising receiving an input parameter designating a maximum allowed delay for communications between transceivers in the multicarrier communication system.

11. The method of claim 1 further comprising receiving an input parameter designating a number of subchannel carriers in the discrete multitone symbol carrying bits.

12. In a multicarrier communication system having a plurality of bearer channels, a method for dedicating bandwidth to the plurality of bearer channels, the method comprising:

determining a number of bits contained in a discrete multitone symbol modulated by a modulator;

receiving a prioritization of the plurality of bearer channels;

determining a number of bytes allocated to each of the plurality of bearer channels using a fast data path based on the prioritization;

determining a number of bytes allocated to each of the plurality of bearer channels using an interleaved data path based on the prioritization;

determining a number of check bytes for the discrete multitone symbol for the fast data path;

determining a number of check bytes for the discrete multitone symbol for the interleaved data path;

receiving a maximum number of bits supported given a specified coding gain;

receiving a framing mode;

receiving a maximum interleave depth;

receiving a maximum number of error correction check bytes;

receiving a latency path;

receiving a maximum allowed delay for communications between transceivers in the multicarrier communication system; and receiving a number of subchannel carriers in the discrete multitone symbol carrying bits.

13. In a multicarrier communication system having at least one bearer channel, a transceiver dedicating bandwidth to the at least one bearer channel, the transceiver comprising:

a modulator modulating a discrete multitone symbol; and a rate option generator in communication with the modulator, the rate option generator determining a number of bits contained in the discrete multitone symbol, receiving a prioritization of the at least one bearer channel, and allocating a portion of the number of bits contained in the discrete multitone symbol to the at least one bearer channel based on the prioritization.

14. The transceiver of claim 13 wherein:

the at least one bearer channel has an associated maximum number of bits and the rate option generator allocates to the at least one bearer channel in descending priority the maximum number of bits for the at least one bearer channel so long as a portion of the number of bits contained in the discrete multitone symbol remain unallocated.

15. The transceiver of claim 13 wherein the at least one bearer channel has an associated minimum number of bits and the rate option generator allocates to the at least one bearer channel in descending priority at least the minimum number of bits for the at least one bearer channel.

16. The transceiver of claim 13 wherein the rate option generator determines a number of overhead error correction check bytes.

17. The transceiver of claim 13 wherein the rate option generator receives an input parameter designating a maximum number of bits supported given a specified coding gain.

18. The transceiver of claim 13 wherein the rate option generator receives an input parameter designating a framing mode.

19. The transceiver of claim 13 wherein the rate option generator receives an input parameter designating a maximum interleave depth.

20. The transceiver of claim 13 wherein the rate option generator receives an input parameter designating a maximum number of error correction check bytes.

21. The transceiver of claim 13 wherein the rate option generator receives an input parameter designating a latency path.

22. The transceiver of claim 13 wherein the rate option generator receives an input parameter designating a maximum allowed delay for communications between transceivers in the multicarrier communication system.

23. The transceiver of claim 13 wherein the rate option generator receives an input parameter designating a number of subchannel carriers carrying bits in the discrete multitone symbol.

24. In a multicarrier communication system having a plurality of bearer channels, a transceiver dedicating bandwidth to the plurality of bearer channels, the transceiver comprising:

a modulator modulating a discrete multitone symbol;

a rate option generator in communication with the modulator, the rate option generator determining a number of bits contained in the discrete multitone symbol, receiving a prioritization of the plurality of bearer channel, determining a number of bytes allocated to the plurality of bearer channels using a fast data path based on the prioritization, determining a number of bytes allocated to the plurality of bearer channels using an interleaved data path based on the prioritization, and determining a number of overhead error correction check bytes; and memory storing a maximum number of bits supported given a specified coding gain, a framing mode, a maximum interleave depth, a maximum number of error correction check bytes, a latency path, a maximum allowed delay for communications between transceivers in the multicarrier communication system, and a number of subchannel carriers in the discrete multitone symbol carrying bits.

* * * * *